March 3, 1964 R. K. GOLDEN 3,123,817

MAGNETIC CORE ANALOG TO DIGITAL CONVERTER

Filed Oct. 11, 1960

INVENTOR
ROBERT K. GOLDEN

BY Delbert C. Thomas

ATTORNEY 3,123,817

MAGNETIC CORE ANALOG TO DIGITAL CONVERTER

Robert K. Golden, Peekskill, N.Y., assignor to International Business Machines Corporation, New York, N.Y., a corporation of New York Filed Oct. 11, 1960, Ser. No. 62,038
7 Claims. (Cl. 340—347)

Figures 1, 2:
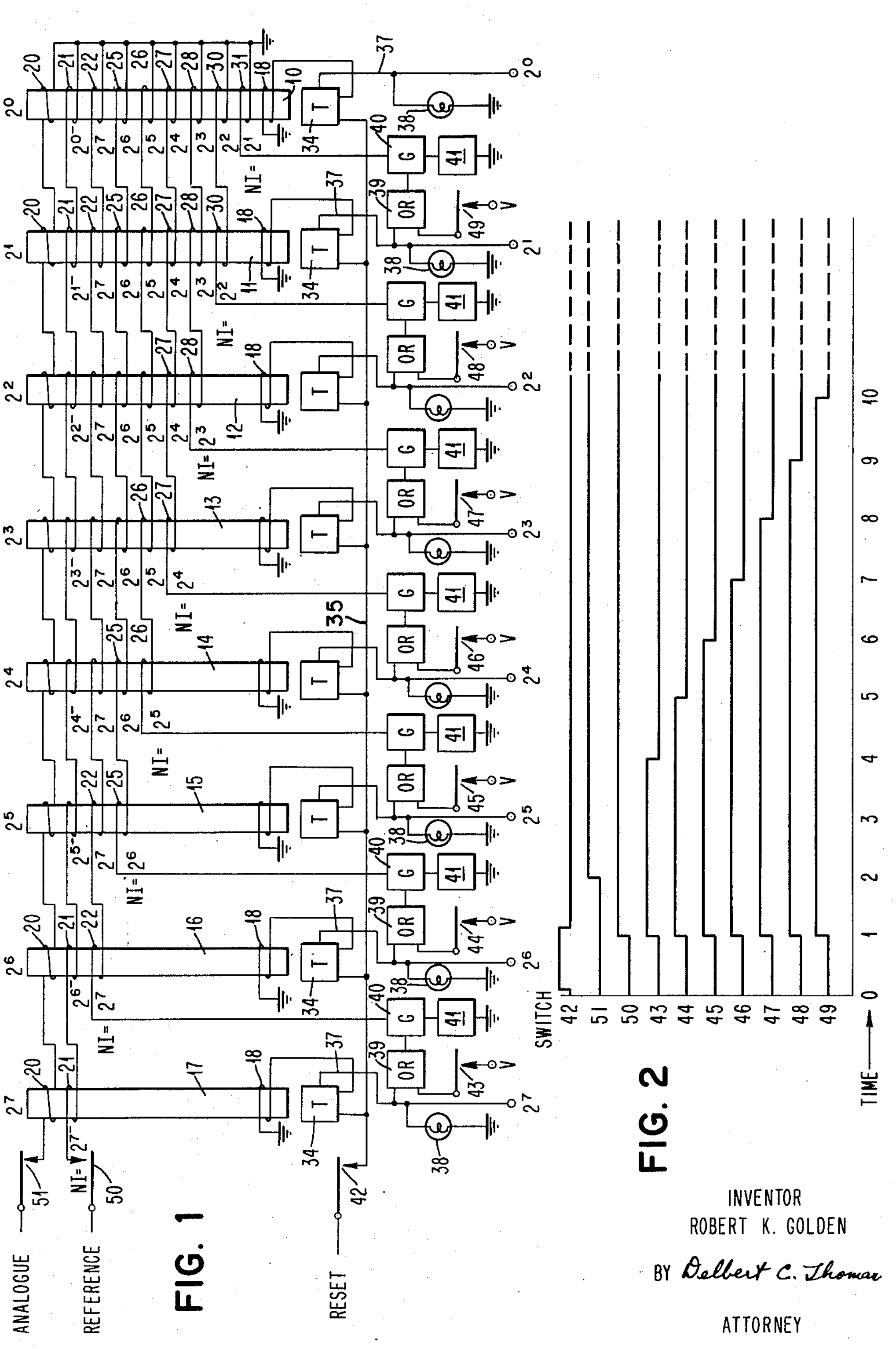

This invention relates to analog to digital conversion apparatus and more particularly to a converter having a plurality of switchable magnetic cores energizable to determine the successive binary digits of the number corresponding to the value of the analog input.

Many types of analog to digital converters are known and they vary widely in speed, principles of operation and cost. Many converters use an electronic counter, a precision current or voltage control circuit for each counter denomination to generate a reference analog value and a very sensitive voltage comparing device to detect a difference between the reference analog and the input analog value. Others generate a plurality of regulated currents or voltages and by a plurality of comparing devices, subtract certain of these currents or voltages from the analog current or voltage to determine the binary digits of the digital number. The comparing devices and the subtracting circuits of this latter type are both expensive, delicate and quite subject to errors due to aging.

It has been determined that magnetic cores of the well known square hysteresis loop type are usable for both subtracting a binary digit value or values from an analog value and for indicating which is the larger, thus providing a comparing and subtracting function in one inexpensive and reliable part. Also the comparison function is based on the absolute difference of the quantities compared and does not change with the magnitude of the quantities nor does the effectiveness of a magnetic core change appreciably with time. As a further advantage, such cores require little power from the analog circuits and will operate at a speed sufficient for most applications.

The converter described herein utilizes one such magnetic core comparing circuit for each denominational order of the binary number to be determined. Each core is initially biased by a flux proportional to the denominational value of its own and all denominations of higher order and an opposing flux proportional to the analog value is then applied. An order by order comparison is then started with the highest denominational order and progressed to the successive lower orders. If, in the highest order, the analog value is greater than the binary denomination value, a corresponding binary denomination winding is kept energized on all lower order cores, otherwise the windings are deenergized. In each successive lower order, the resultant flux in the core, that is, the flux due to the analog value less the flux due to the higher order binary denomination windings remaining energized, is tested to determine whether the binary denomination windings corresponding to that order and on the lower order cores are to be kept energized or are to be deenergized. After the final comparison in the lowest order core, the analog value is determined in binary terms and will be indicated by the denomination circuits remaining energized.

It is then an object of this invention to provide an analog to digital converter using magnetic cores together with simple and reliable electronic circuits.

It is also an object to provide an analog to digital converter capable of high speed, accurate operations without moving parts, or expensive and delicate components.

A further object of the invention is the provision of a sturdy, reliable converter using magnetic cores and stable electronic components of the switching, on or off, type.

A still further object is the provision in a converter of magnetic core comparing circuits to determine the digits of the binary number equal to the value of an analog quantity applied to the converter.

Another object is to develop a converter which requires a minimum of expensive regulating circuits to provide reference values.

The foregoing and other objects, features, and advantages of the invention will be apparent from the following more particular description of a preferred embodiment of the invention, as illustrated in the accompanying drawings.

In the drawings:

FIGURE 1 is a diagrammatic showing of the preferred embodiment of the invention; and FIGURE 2 is a diagram showing the timing of energization of the circuits of FIGURE 1.

As shown in FIGURE 1, there are eight magnetic cores 10 to 17 provided, one for each binary order digit to be determined, although more or less cores may be used as required for the precision desired. Each core is composed of a well known high retentivity magnetic material such as magnetic iron oxide with a substantially square hysteresis loop. It is characteristic of such cores that one magnetic orientation will be retained until application of at least a minimum flux tending to force an opposite orientation and the core will then switch rapidly to said opposite orientation. Each core has a plurality of conductive windings which are energizable to induce a flux therein. One winding 18 on each core 10–17 is designated as a sense winding to indicate when its core switches from one to another direction of magnetic orientation. Each sense winding 18 is shown with one end grounded and will give a positive voltage pulse at the other winding end when the core changes orientation from a first to a second direction and a negative pulse at said other winding end when the orientation changes from the second to the first state. Also each core 10 to 17 has a winding 20 which is energized to provide a flux proportional to the analog value to be converted into binary form. It should be noted that each core is magnetically independent of the other cores and therefore the flux due to the analog windings need not be the same in all cores. It is necessary only that the fluxes generated in any core by consistent with each other but any desired flux ratio may be used between the cores.

Each of the cores 10 to 17 also has a reference winding 21 thereon to induce a reference flux in each core 10 to 17 which flux is opposed to the flux generated by the analog winding 20. In each core 10 to 17 the flux due to winding 21 is made substantially proportional to the value of the binary denomination of the core. That is, in core 17, the flux due to winding 21 will be proportional to $2^7$ as compared to the analog value, in core 16 the flux from winding 21 will be proportional to $2^6$, for core 15, the flux is proportional to $2^5$ etc. until for core 10, the flux from winding 21 is proportional to $2^0$. In FIGURE 1, the windings 21 are shown in series so that the same current flows in each winding, which requires that the number of turns in the winding 21 for a core be proportional to the digital value associated with the core 10 to 17, thus winding 21 for core 17 would require 128 times as many turns as winding 21 for core 10. This may be impractical for small cores and the larger binary denominational values and, as an alternative, windings 21 may be separated into two or more circuits having different currents therein, the sole essential being that the flux induced in each core 10 to 17 by windings 21 be proportional to the value of the denominational order of the core.

It will be noted that in FIGURE 1, the flux value indicated for each winding 21 has a minus sign as a superscript. This is to indicate that the flux induced by the winding is sufficiently less than the exact binary value to enable the core 10 to 17 to be switched to the opposite magnetization by an exact analog value. Considering, for example, core 17, winding 21 is first energized to switch the core to one magnetic state and winding 20 is then energized. If the flux due to winding 21 were exactly proportional to $2^7$ and the analog value to be read were exactly $2^7$, the fluxes due to windings 20 and 21 would just neutralize each other and the core 17 would remain in the set state. When, however, the flux from winding 21 is less than the denominational value by the amount of flux needed to switch the core 17, the unneutralized flux from winding 20 when the analog value is exactly $2^7$ will be enough to switch core 17 to the opposite state. If the provision of slightly less flux than is required for the exact denominational value introduces complications due to fractional winding turns or current regulation, windings 21 may be energized to provide the exact digital flux required and the switching flux may be provided for the cores 10 to 17 by a separate bias winding whose flux aids that of winding 21. In effect, this amounts to an offset in the comparing point of a core and it will be recognized that the more abruptly a core switches from one state to the other, the sharper will be the distinction between adjacent analog values.

Cores 10 to 16 are also provided with a winding 22 which is retained energized if the analog value being converted is equal to or greater than $2^7$. The flux from winding 22 opposes that of analog winding 20 and for each core is proportional to $2^7$, in effect subtracting that value from the analog value. Similarly, each of the cores 10 to 15 has a winding 25 which will be retained energized if the binary equivalent of the analog value has a $2^6$ term and will, in effect, subtract $2^6$ from the analog value. Cores 10 to 14 have another winding 26 which is kept energized if the binary equivalent has a $2^5$ term, cores 10 to 13 have a winding 27 which will stay energized if the equivalent binary number has a $2^4$ term. Also cores 10 to 12 have a winding 28 for the $2^3$ term, cores 10 and 11 have a winding 30 for the $2^2$ term and core 10 has a winding 31 for the $2^1$ term. In each case, only the fluxes produced by the windings 22, 25, 26, 27, 28, 30 and 31 are of concern and the number of winding turns and the current through them can be varied inversely as desired to produce a satisfactory winding arrangement. As noted above with respect to windings 21, the series arrangement of the binary digit windings 22, 25, 26, 27, 28, and 30 is not essential and other well known arrangements to induce the required fluxes in cores 10 to 16 may be used as desired.

Each of the cores 11 to 17 has associated therewith a control circuit to determine if the associated binary digit winding for all lower cores shall be retained energized. Each control circuit comprises a trigger 34 which is reset to one of its two stable states at the start of a conversion cycle by a pulse on the common line 35 connected to the reset terminals of all triggers 34. Each trigger 34 has a set terminal which when energized by an appropriate signal will set the trigger to the other of its stable states and each set terminal is connected to the free end of the sense winding 18 on its associated core 11 to 17. The triggers 34 are polarity sensitive and are so connected to winding 18 that the voltage pulse from a winding 18 when the core is switched from the initial state by the current through analog winding 20, will be effective to set the associated trigger 34 whereas the setting of the core to the initial state by windings 21, 22, 25, 26, 28, 30, and 31 will have no effect on the trigger 34.

When a trigger 34 is set, a control voltage is present on its output line 37 and this voltage may be conducted to output terminals and to indicators 38. Each output terminal represents one binary order of the equivalent binary number and the combination of energized and unenergized output terminals will represent the full equivalent binary number. Each output line 37 is also connected to one input of a conventional OR gate 39 which will give an output signal when any input is energized. The other input of OR gate 39 is connected to a control voltage to be later described. The output of OR gate 39 is connected to a gate or switch 40 to enable flow of current from a source 41 of regulated current through the windings 22, 25, 26, 27, 28, 30 or 31 for the binary order corresponding to the controlling core 11 to 17. The sensing winding 18 for core 10 is connected to a trigger 34 similar to the other triggers 34 but since there is no core of a lower order or a winding corresponding to the $2^0$ binary order, the output of associated trigger 34 is used for indicating the digit value only.

When it is desired to convert an analog value into digital form, the sequence of operations is as indicated in the timing diagram of FIGURE 2 which has an arbitrary time base. This sequence may be controlled by any suitable equipment as cam operated switches, electronic switches or similar devices and the first step is the closure of a switch 42 to apply a reset voltage to common line 35 to pull all triggers 34 into their reset state. Immediately after this at time 1, switches 43 to 50 are closed to apply control voltage to all OR gataes 39 to activate gates 40 and to complete the circuit through windings 21. Activation of gates 40 will connect the current sources 41 to energize all windings 22, 25, 26, 27, 28, 30 and 31. Such energization will set all cores 10 to 17 into an initial state. After any transients generated have dissipated, the reset voltage on line 35 is removed to free triggers 34 for operation to the set state. The output lines 37 of triggers 34 are at a non-controlling voltage at this time but the gates 40 pass current because OR gates 39 have their outputs held at a control voltage by the inputs through switches 43 to 49.

The analog circuit is next completed through windings 20 by closure of switch 51 at time 2, and depending upon the analog value, the flux due to windings 20 may switch one, or two, or more of the cores starting with core 17. When any core is switched to the opposite state, the voltage pulse induced in winding 18 will switch the connected trigger 34 to its set state causing a control voltage to appear on its output line 37. Shortly thereafter at time 4, switch 43 is opened and its control voltage is removed from OR gate 39 for core 17. If the trigger 34 for core 17 has been set, its line 37 is at the control voltage and the output of its OR gate 39 continues at the control level to maintain activation of gate 40 and retain the energization of the $2^7$ windings 22 on cores 10 to 16. If, however, the core 17 did not switch its state, this indicates that the analog value is less than $2^7$, trigger 34 for core 17 is not set and when the switch 43 is opened, all control voltage is removed from OR gate 39. The output of the OR gate 39 then goes to the ineffective level and its gate 40 halts the flow of current through windings 22.

If the analog value is greater than $2^7$ plus $2^6$, it will have caused both cores 17 and 16 to switch state and the triggers for cores 16 and 17 will both have been set when the analog circuit was completed at time 2. If, however, the analog value is $2^6$ or more but less than $2^7$, core 17 does not switch and when switch 43 is opened, the current through winding 22 of core 16 disappears. This leaves only the flux through winding 21 to oppose the flux due to the analog current in winding 20 and in the assumed case, this is not sufficient to hold core 16 in the initial state. Core 16 will therefore switch from its initial state when switch 45 is opened and will set its trigger 34 to maintain current flow through its gate 40 and the $2^6$ windings 25 on cores 10 to 15 after switch 44 for its OR gate 39 is opened at time 5. Where the analog value is less than $2^6$ or is more than $2^7$ but less than $2^7$ plus $2^6$, the initial flux from winding 20 or the resultant flux if the $2^7$ winding 22 is energized, is insufficient to overcome the $2^6$ flux from coil 21 and switch core 16 from its initial state so that trigger 34 for core 16 is not set. Therefore, when control voltage is removed from its OR gate 39 by opening of switch 44 at time 5, the current through the $2^6$ coils 25 stops which may permit cores 15, 15 and 14, 15, 14, and 13 or a like group to switch from their initial state and set their triggers 34.

There are four ranges of analog values which will cause core 15 to switch from its initial state and set its trigger 34 to maintain current through the $2^5$ windings 26. When the analog value is $2^7$ plus $2^6$ plus $2^5$ or more, core 15 will switch at time 2 when the analog current starts in winding 20. If the analog value is $2^6$ plus $2^5$ or more but less than $2^7$, core 15 will switch when switch 43 opens to deenergize winding 22. For the other two cases, when the analog value is at least $2^5$ but less than $2^6$ or at least $2^7$ plus $2^5$ and less than $2^7$ plus $2^6$, core 15 will switch when the current through the winding 25 stops as switch 44 opens. For other values of the analog, core 15 will not switch and the $2^5$ current through windings 26 will cease as switch 45 opens at time 6.

The operation for the lower order cores 10 to 14 is substantially similar to the above description for cores 15, 16, and 17 in that each core will switch to the opposite state if the analog value flux is greater than the effective binary value flux selected by the set cores of higher denominational order plus the denominational value flux set by winding 21. Setting of any core from its initial state will set its trigger 34 to maintain a current flow through its gate 40 and the windings of like denominational value on all lower order cores. The switches 43, 44 . . . 49 for cores 17, 16 . . . 11 are opened successively starting at time 4 so that each core can be set successively going from core 17 to core 10. The initial reference current through windings 21 is not removed until a new analog conversion cycle is started. After all switches 43 to 49 are opened, the triggers 34 which are set will show by their activated indicators 38 which binary orders have a significant digit therein and these indications may be utilized in any desired manner.

As a specific example, assume that the analog value to be converted is 11100000. When analog current passes through windings 20 at time 2, the resulting flux will be sufficient to switch cores 17, 16, and 15 from their initial setting and will set their three triggers 34 to prevent interruption of the current through windings 22, 25, and 26 for all lower order cores. In each lower order core 10–14, the flux from windings 22, 25, and 26 plus that from winding 21 will be greater than the flux from the analog winding 20 and none of these cores will be switched. Therefore, after switch 49 opens at time 10, the only triggers set are those for the cores 17, 16 and 15 and the indicators 38 of these triggers will indicate the correct binary value 11100000.

As a second example, assume that the analog value is 01101011. The flux due to this analog value is less than the $2^7$ flux in core 17 from the current in winding 21 and the flux induced in cores 10 to 16 by winding 22 so that none of the cores 10 to 17 will be switched when the analog current is passed through winding 20 at time 2. Trigger 34 for core 17 will not have been set and the current through windings 22 will stop when switch 43 is opened at time 4. Now core 16 will have an analog flux of a value of 1101011 which is greater than the flux from winding 21 which has a value of 1000000 and core 16 will switch to set its trigger 34. Also, core 15 will switch at this time since its analog flux has a value of 1101011 which is greater than the flux of 1100000 from windings 21 and 25. When the switches 44 and 45 separately open, there is no change in the current flow as the set triggers for cores 16 and 15 maintain current flow in windings 25 and 26. Core 14 cannot switch in this conversion cycle for the analog flux value 1101011 is less than the flux value of 1110000 impressed by windings 21, 25, and 26 and therefore when switch 46 opens at time 7, the current through the $2^4$ windings 27 ceases and core 13 will switch since its analog flux value of 1101011 is more than the flux value of 1101000 from coils 21, 25, and 26. Switching of core 13 will maintain current through the $2^3$ windings 28 after switch 47 opens at time 8. In core 12 the flux value from windings 21, 25, 26, and 28 is 1101100 which is more than the analog flux value so that core 12 does not switch state and the current through windings 30 stops when switch 48 opens at time 9. In both remaining cores 10 and 11, the analog flux has a greater value than the flux values of 1101010 and 1101011 impressed on these cores by the energized windings so the triggers 34 for these cores will be set. In the case of core 10, it will be noted that the opposing flux is indicated to be equal to that due to the analog value but, as above noted, the effect of the windings 21 is sufficiently reduced to allow switching to take place under this equality condition so that trigger 34 for coil 10 will be set. The indicators 38 for triggers 34 now indicate the digital binary value of 01101011 for the analog input.

In general as will be seen from the above, each core is initially subjected to a flux approximately equal to its denominational value and to the sum of the denominational values of the higher denominations and also to an opposing flux proportional to the analog value to be converted. If the analog value is the greater, the core is switched from its initial state and a flux proportional to the denominational value of the core remains subtracted from the analog flux in each lower order core. If the analog flux is the lesser, no switching occurs and the flux proportional to the denominational value of the core is removed from the lower order cores. In either case, the next lower order core then will be switched if the resulting flux is less than the value assigned to the core. If any core does not switch from its initial magnetic state, the current producing a flux proportional to the denominational value of that core in all lower order cores will be stopped during the conversion cycle and the lower order cores will then be subjected to a different flux resultant which may or may not cause some cores to switch as determined by the impressed analog value. After the lowest denominational order core has compared the remaining analog value flux less the flux proportional to the determined higher order binary digits to determine the lowest order digit, the outputs of the triggers which were set when the cores switched may be tested to indicate the converted analog value.

It may be noted that the above description has been set out with the implied assumption that the analog value remains constant during the interval required for conversion and this will generally be true where the components used in this converter are electronic and operate in a conversion cycle of from 80 to 100 microseconds. For very rapidly varying analog values, it will be desirable to provide a holding circuit to maintain a constant analog input during the conversion.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a converter for determining a digital binary number equivalent to an analog value, a plurality of cores, each core switchable from one magnetic state to another and each representing one denominational order of a binary number, means to generate in each core a flux substantially proportional to the sum of the values of the denominational orders represented by said core and all cores of higher denominational order whereby said plurality of cores will be set to said one magnetic state, means to apply to each core an opposing flux proportional to said analog value and tending to switch said cores to said other state, flux control means to stepwise reduce the generated flux in each of said cores to a flux not substantially less than the flux proportional to the value of the denominational order represented by said core, the first step of flux reduction being proportional to the value of the highest denominational order represented and effective in all lower order cores, each succeeding step being equal to one-half of the amount of the immediately prior step and effective in successively fewer lower order cores, and means controlled by any core when switched to said other state by said opposing flux to control said flux control means to prevent, in all lower order cores, the flux reduction step proportional to the denominational value of the core switched.

2. In a converter for determining a binary number equivalent to an analog value, a plurality of cores switchable from one magnetic state to another, each core representing one binary denominational order, a winding on each core to generate a flux proportional to the analog value to be converted, a second winding on each core to generate an opposing flux substantially proportional to the value of the denominational order represented by the core, means to generate in each core an additional opposing flux proportional to the sum of the higher denominational orders, control means to first apply said opposing fluxes to said cores to set said cores to said one magnetic state, to thereafter enable energization of said analog windings and to thereafter stepwise deactivate said generating means to reduce said additional opposing flux by successive steps, the first step being proportional to the value of the highest denominational order and each succeeding step being of one-half of the value of the immediately prior step, and means controlled by each switched core to maintain, in all cores of lower denominational order, an opposing flux proportional to the denominational value of the core switched.

3. In a converter to determine a digital binary number equivalent to an analog value, a plurality of cores switchable from one magnetic state to another and each representative of one denominational order of said binary number, means to produce in each core a flux substantially proportional to the value of the denomination represented by said core, a plurality of second means, one associated with each core except the core representing the lowest denominational order, to produce in all cores of lower denominational order an additional flux proportional to the value of the denomination of the associated core, means to apply to each core an opposing flux proportional to said analog value, switching means to first energize said first and second flux producing means to set said cores into said one magnetic state, to then energize said opposing flux applying means to tend to reset said cores to said other magnetic state and to thereafter deactivate said plurality of second means seriatim starting with the one associated with the core representing the highest denominational order, and an output device for each core, each output device being settable by its core when the core is switched to its other magnetic state and acting when set to prevent deactivation of the one of said plurality of second means which is associated with its core, the set output devices representing the significant digits of the equivalent binary number.

4. In a converter to determine a digital binary number equivalent to an analog value, a plurality of cores, one for each denominational order of said binary number and each switchable from one magnetic state to another, a first winding on each core energizable to produce in each core, a flux substantially proportional to the value of the denominational order of said core, a second winding on each core to produce an opposing flux therein proportional to said analog value, one additional winding on each core other than the core of highest denominational order for each core of higher denominational order, means to energize said first windings and said additional windings to set said cores to said one magnetic state and to then energize said second windings to tend to switch said cores to said other state, sequentially operating switches to deenergize said additional windings starting with those related to the core of highest denomination order and means including a sense winding on each core and a trigger circuit set when said core is switched to said other state to maintain energization of the windings related to said core on the cores of lower denominational order.

5. In a converter to determine a digital binary number equivalent to an analog value, a plurality of cores switchable from one magnetic state to another, each denominational order of said binary number being represented by one of said cores, a winding on each core to induce a flux therein substantially proportional to the value of the denominational order of said core, a second winding on each core to induce therein an opposing flux proportional to the analog value, a sense winding on each core and a trigger connected thereto to be set when said core is switched to said other state, a current source for each core other than the core of lowest denomination and a winding energizable by each current source on each core of lower denominational order, a plurality of switch means cyclically operated to first energize said first windings and said current source energizable windings to set said cores to said one magnetic state, to secondly energize said second windings to tend to reset said cores to said other state and thirdly to deenergize said current source energizable windings seriatim starting with the windings energized by the current source for the highest denominational order core and a gate controlled by each set trigger other than that of the lowest denomination core to maintain energization of the windings connected to the current source for its core.

6. In a converter to determine a binary digital number equivalent to an analog value, a core for each denomination of said number, each core being switchable from one magnetic state to another, a first winding on each core to induce therein a flux substantially proportional to the value of the denomination of said core, a second winding on each core to induce therein an opposing flux proportional to said analog value, a sense winding on each core, a plurality of triggers, one connected to each sense winding to be set to a control state when the sense winding connected thereto generates a pulse to indicate that its core has switched to said other state, a denominational current source for each core other than the core of lowest denomination, a winding energizable on each core of lower denomination by each current source to induce in said lower denomination cores a flux proportional to the value of the denomination of the current source, a gate for each current source, each gate activatable to control energization by its current source of the windings energizable thereby, switches to firstly energize said first windings and to activate said gates to enable energization of all said current source windings whereby said cores will be set to said one magnetic state, to secondly enable energization of said second windings to tend to set said cores to said other state, and to thirdly deactivate said gates seriatim starting with the gate for the current source of the highest denomination order core, and means connecting the trigger and the gate for each core to maintain said gate activated when said trigger is set.

7. A converter as set out in claim 6 including means acting prior to a conversion operation to set said triggers to a noncontrolling state and an indicator connected to each trigger to indicate that its trigger is set and that the represented denominational order of the equivalent binary number contains a significant digit.

References Cited in the file of this patent

UNITED STATES PATENTS 2,962,704 Buser ---------------- Nov. 29, 1960